July 26, 1966     E. S. GWATHMEY     3,262,311
AIRCRAFT DIRECTOR SYSTEM
Filed Sept. 9, 1963     2 Sheets—Sheet 1

INVENTOR.
Edward S. Gwathmey

July 26, 1966  E. S. GWATHMEY  3,262,311
AIRCRAFT DIRECTOR SYSTEM

Filed Sept. 9, 1963  2 Sheets-Sheet 2

INVENTOR.
Edward S. Gwathmey 3,262,311
Patented July 26, 1966

3,262,311
AIRCRAFT DIRECTOR SYSTEM
Edward S. Gwathmey, Earlysville, Va., assignor, by mesne assignments, to Teledyne, Inc., Hawthorne, Calif., a corporation of Delaware
Filed Sept. 9, 1963, Ser. No. 307,692
12 Claims. (Cl. 73—178)

This invention relates generally to aircraft instruments and instrument systems and is especially directed to instrument systems or controls for indicating or controlling the operation of aircraft during all stages of take-off and landing.

It is well known that knowledge of flight conditions during take-off and landing operations is of great importance to the pilot since flight during these periods is particularly hazardous. In the past, there has often been uncertainty and confusion on the part of the pilot since he has had to watch numerous instruments as well as the ground, during landing operations, for instance. Similar conditions have existed during take-off. The need for a suitable flight director is particularly acute in high performance jet aircraft.

It is an object, therefore, of the present invention to provide a flight director which will give the pilot a simple, reliable indication for controlling the aircraft to the optimum flight speed V relative to the stall speed Vs; the V/Vs Director being used during take-off rotation, climbout, landing approach and go-around.

Another object is to provide an instrument system which I call a V/Vs Director, as defined above, in which an indicator will be kept in register with a mark so that the pilot will know that important flight conditions are satisfactory as long as this in-register condition is maintained.

A further object is to provide a V/Vs Director which, when centered or in in-register condition, insures that the aircraft will fly at optimum V/Vs even in the event of loss of engine thrust through engine malfunction or for noise abatement or the like.

An additional object is to provide a V/Vs Director which can be used as a control for airspeed, especially during holding and approach, to insure the desired V/Vs for the existing conditions.

Another object is to provide a V/Vs Director which can be used as a speed control based on angle of attack, for holding patterns or approach.

Other objects will be evident in the following description.

Figure 1:
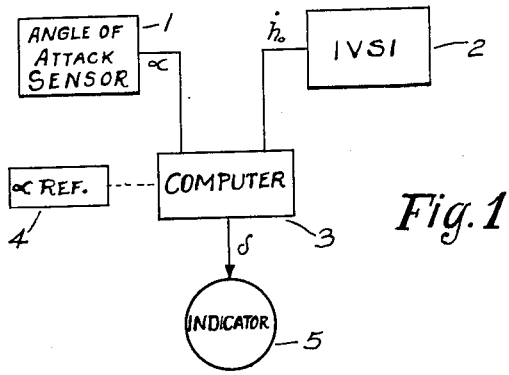
Figure 2:
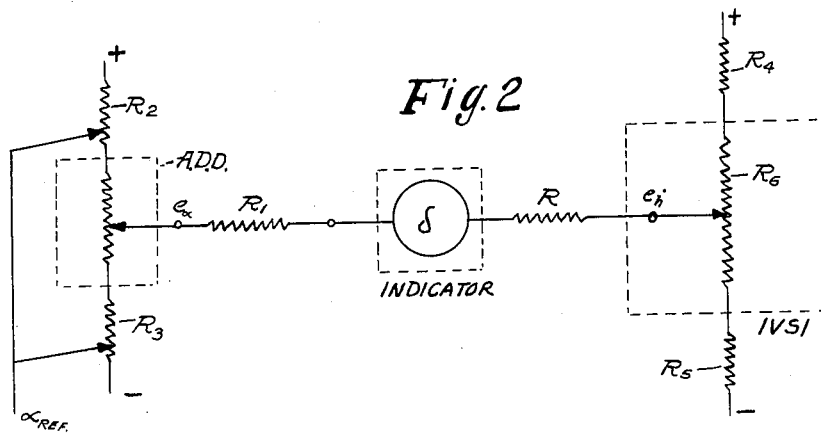
Figure 3:
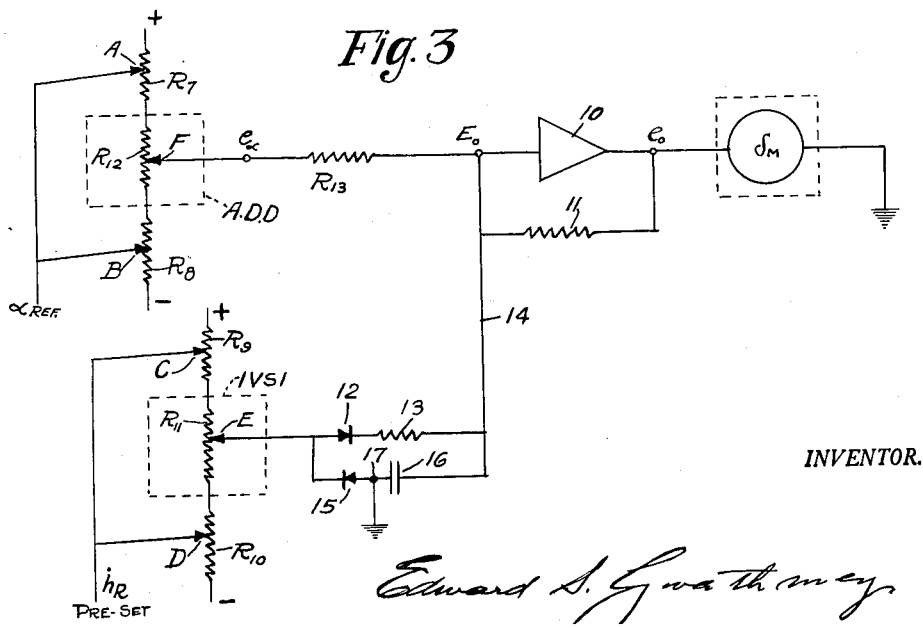
Figure 4:
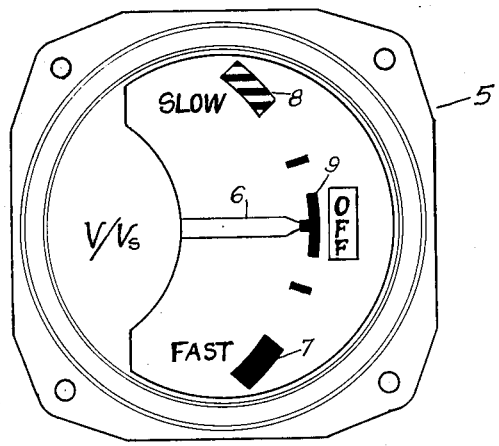
Figure 5:
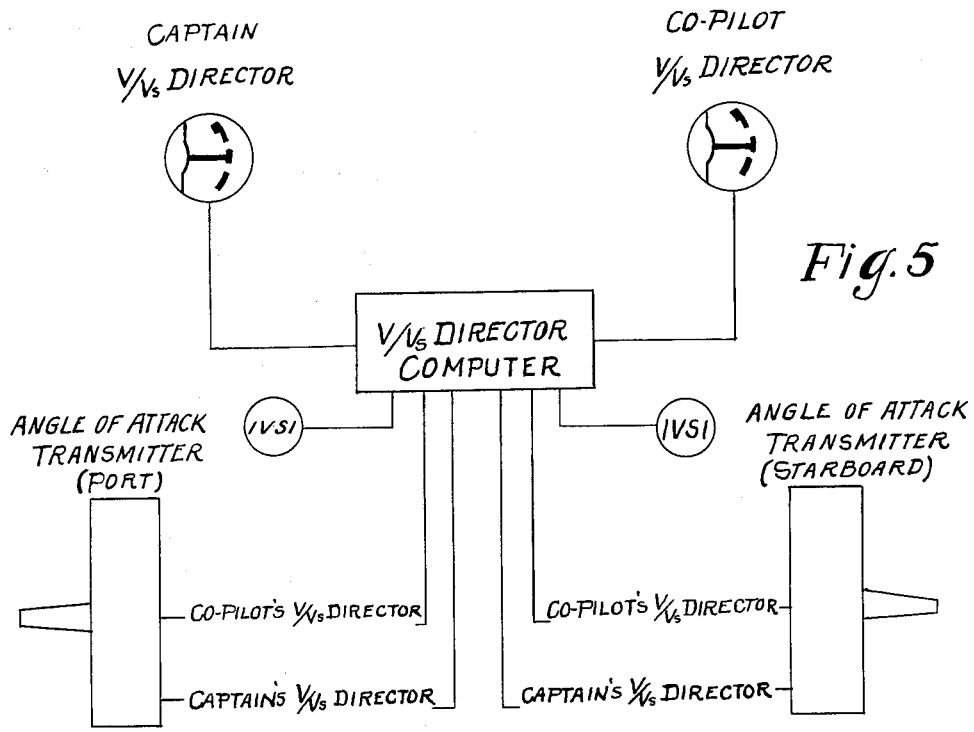

In the drawings:
FIGURE 1 is a block diagram or representation of my V/Vs Director.
FIGURE 2 is a circuit diagram indicating component parts and connections of my Director or system.
FIGURE 3 is a circuit diagram of a more elaborate version of my Director or system.
FIGURE 4 is a face view of my V/Vs instrument.
FIGURE 5 is a block diagram of a dual system V/Vs Director.

*Background.*—It is well-known that the steepest climb of an airplane occurs when it is flown to yield the maximum value of the ratio of lift coefficient to drag coefficient. At low airspeeds, this ratio is a function of angle of attack only. Furthermore, a study of typical transport designs shows that, for all practical purposes, the angle of attack for the maximum lift to drag ratio is independent of flap configuration. There is, consequently, too little benefit to be derived from flap compensation to justify the added cost and complexity to the proposed system.

Therefore, a quickly understood display of lift coefficient corresponding to "best climb" can be satisfied by comparing the actual angle of attack to a reference (command) angle of attack specified to yield maximum L/D for the particular aircraft.

The pilot-indicator-airplane system damping can be provided by the addition of a signal proportional to the time rate of change of total pressure to the angle of attack signal. The basic theory of a pilot's indicator based on combined angle of attack and total pressure rate is given in NASA TN D–948 dated September 1961 by A. W. Hall and J. E. Harris. It is shown in this publication that a relatively small signal component proportional to the total pressure rate provides good phugoid damping (e.g., a damping ratio of seven-tenths) together with smoother, easier tracking by the pilot. NASA TN D–948 also covers a simulator study of the take-off rotation and climbout problems of a supersonic transport.

Experimental flight tests have been made with a system which provides a pointer display combining angle of attack and total pressure rate. The flight tests in smooth air have established that the NASA simulator results can be very closely approximated by the use of this instrument in actual flight. The climbout paths of the F9F–8T test airplane show the predicted improvement over standard instrument procedures. The flight tests have also brought out the seriousness of signal noise in the pressure rate components in turbulent air. In rough air, tracking of the pointer is very difficult and climbout performance is deteriorated.

Therefore, I propose to substitute vertical speed, $\dot{h}$, from an Inertial-lead Vertical Speed Indicator (IVSI) for the total pressure rate, $\dot{P}$, as the pilot-indicator-airplane system damping component. The IVSI output would be practically noise free at the gain used in the V/Vs Director System and the inherent lead provided by the IVSI should improve tracking. The validity of the substitution of $\dot{h}$ for $\dot{P}$ in the system equation will be supported in the following section.

*Theory.*—The operation of the flight test indicator can be described by the equation $$\delta = G_1(\Delta\alpha - K_1\dot{P}) \tag{1}$$

in which: $\delta$ is the pointer deflection, $G_1$ is the sensitivity of the indicator, $\Delta\alpha$ is the difference between the actual angle of attack and the reference (command) angle of attack, $K_1$ is a constant determined by type of airplane, and $\dot{P}$ is the time rate of change of total pressure.

The total pressure, P, is the sum of the dynamic pressure, $q$, and the free stream pressure, S. The time rate of change of total pressure can then be written as $$\dot{P} = \dot{q} + \dot{S} \tag{2}$$

which, when expanded, becomes $$\dot{P} = \rho v \dot{v} - \rho g \dot{h} \tag{3}$$

in which: $\rho$ is the air density (assumed to be constant over the range of altitudes of interest), $v$ is the airspeed, $\dot{v}$ is the acceleration along the flight path, and $g$ is the acceleration of gravity. It has been found that, for equal phugoid damping, the term containing the acceleration along the flight path can be dropped if the gain of the vertical speed term is increased by approximately one-third of itself. Therefore, we can substitute $K\dot{h}$ for $-K_1\dot{P}$ in Equation 1 and obtain $$\delta = G(\Delta\alpha + K\dot{h}) \tag{4}$$

Equation 4 describes the operation of the V/Vs Director System using vertical speed as the phugoid damping component to satisfy requirements previously described i.e., that the closed loop system must be well damped and that the tracking burden on the pilot should not be excessive.

*System components.*—The system components for a dual system (pilot and co-pilot) are shown in the block diagram, FIG. 5. The two Inertial-lead Vertical Speed Indicators (IVSI's) provide phugoid damping as discussed above. The electrical output of these instruments corresponds to a vertical speed of minus 3000 to plus 5000 feet per minute. The two $V/Vs$ Director Indicators provide the pointer display for pilot direction. The pointer deflection is described by Equation 4. Thus, once the system has been set up, the pilot flies to keep the indicator "zeroed" and the angle of attack for the steepest climb, at any throttle setting, is automatically attained. A malfunction indication in the form of an OFF flag is located at a prominent position on the indicator dial. The $V/Vs$ Director Computer contains the power supply, computation circuitry, and the adjustable setting for reference angle of attack.

The dual system $V/Vs$ Director consists of the following equipment:

2 Angle of Attack transmitters
2 Inertial-lead Vertical Speed Indicators (IVSI*)
2 $V/Vs$ Director Indicators
1 $V/Vs$ Computer

*Location and description of the components.*—The primary signal to the $V/Vs$ Director is angle of attack; the signal is supplied by two Specialties' Angle-of-Attack Transmitters. These transmitters are located on the fuselage well forward of the wing. The transmitters should be located diametrically opposite each other on the fuselage and approximately on the fuselage waterline. This location will average out the effects of sideslip and will be in an area of smooth flow relatively free from ground-handling damage.

The newly designed (conically shaped probe) Angle-of-Attack Transmitter was developed to have greatly improved environmental resistance. Because of a unique self-draining feature, water ingestion will not cause damage and therefore a probe cover is not required. New type heater elements, with much greater output and reliability, prevent any icing even under the most severe conditions.

Two outputs from each of these transmitters drive both the pilot's and co-pilot's $V/Vs$ Directors so that in the event of total or partial electrical failure or mechanical failure in either transmitter, a warning system incorporated in the directors alerts the pilot to the fact that the angle-of-attack input is malfunctioning and the director should not be used. This warning device is actuated whenever the output from one angle-of-attack transmitter differs from the other by a predetermined number of degrees, or whenever electrical current is interrupted in the circuit. In essence one transmitter is always monitoring the other for correct operation. Normally balanced bridge circuits or other suitable circuits can be used for this warning system.

The flight path damping signal to the $V/Vs$ Director is supplied by electric outputs from the two Inertial-lead Vertical Speed Indicators (IVSI*) which are located on both the pilot's and co-pilot's panels. The IVSI is used as a flight instrument by the pilot and co-pilot for aid in control of vertical speed of the aircraft.

The Specialties' IVSI has been widely used by the airlines for over 5 years and has been found to be a very reliable instrument. The $V/Vs$ Computer contains the electrical circuitry for computing optimum $V/Vs$. Inputs from the angle-of-attack transmitter and the IVSI are fed into this computer. The $V/Vs$ Director and stall warning device receive outputs from this computer. The computer is designed to be mounted in any position and in any area of normal environment. Circuit design is such that it incorporates all solid state components in a completely passive network.

In FIGURE 1, instrument 1 is an Angle-of-Attack sensor such as an Angle-of-Attack transmitter manufactured by Specialties, Inc. of Charlottesville, Virginia.

*Trademark Registered.

This transmitter is preferably attached to the fuselage well foward of the wing. This location will minimize the effects of sideslip and will be in an area of smooth flow relatively free from ground-handling damage. The Angle-of-Attack transmitter has a conical probe having a self-draining feature so that a probe cover is not required. Icing is prevented by means of an electrical heater element or elements. Pertinent U.S. patents, owned by Specialties, Inc. are Nos. 2,701,473; 2,971,375; 2,977,793; and 2,995,930. Specialties' patents relating to Angle-of-Attack are Nos. 2,526,685; 2,996,705; and 3,008,134.

Instrument 2 is an Inertial-lead Vertical Speed Indicator manufactured by Specialties, Inc. as designated above. This instrument is widely known in military and commercial circles by its tradename "IVSI." Instruments 1 and 2 are operatively connected with computer 3, details of which will be described later. A settable angle of attack ($\alpha$) reference 4 is connected with computer 3 the electrical output $\delta$ of which is fed into indicating instrument 5 which will be described. Specialties' patents relating to IVSI or similar instruments are Nos. 2,973,643; 2,979,948; and 3,040,134.

The face of instrument 5 is shown in FIGURE 4. This instrument is electrically operated and may comprise a moving coil type voltage or current sensitive instrument. Under normal operation of the instrument, the pointer is maintained in register with the mid-point or neutral Mark 9. The electrical output $\delta$ of the computer 3 is electrically connected with the $V/Vs$ Director instrument 5 as indicated. When $\delta$ is positive the pointer 6 moves toward the "slow" Mark 8, corresponding to a condition of flight at less than the desired speed and when $\delta$ is negative the pointer 6 moves toward the "fast" Mark 7, corresponding to a condition of flight at more than the desired speed.

In operation, the Angle-of-Attack reference 4 is set for the desired reference angle of attack $\alpha_R$ and this preset value is fed into computer 3 which compares this value with that of the actual angle of attack as determined by instrument 1. The difference signal is then combined with electrical or other signal from IVSI 2 and computer 3 then supplies to indicator 5 a signal which displaces pointer 6 from the Mark 9 if the optimum flight speed relative to the stall speed is not as prearranged. If there is a discrepancy, the pitch is changed by adjusting the elevator until pointer 6 is centered on Mark 9. Under this condition, the aircraft is flying with optimum flight speed relative to stall speed.

There are certain system requirements which should be met. To be specific, the display should direct the pilot's control of pitch attitude so that he can quickly establish the value of lift coefficient corresponding to the steepest path which is safe and feasible. Likewise, the closed loop system of pilot, indicator, and aircraft should be well damped. Furthermore, the tracking burden placed upon the pilot must not be excessive. A minimum criterion is that the indication must enable the pilot to control flight path with less effort than would be required by a combined scan of standard flight instruments. And, since the system is used during take-off and landing, system reliability must be high and malfunction warning should be provided.

In my relatively simple $V/Vs$ system as illustrated by the diagram of FIGURE 2, the computer includes the components $R_1$, $R_2$, $R_3$, $R$, $R_4$ and $R_5$. The movable contacts or slides of resistors $R_2$ and $R_3$ are mechanically linked to be moved together in accordance with the angle of attack as determined by the A.D.D. shown in the box. The abbreviation A.D.D. means Airstream Direction Detector. Likewise, the $\delta$ indicator and IVSI components including the potentiometer $R_6$ are included in the box marked "IVSI." Resistors $R_4$ and $R_5$ located in the computer, are connected with polarities as indicated. The theory of operation has been explained.

In the more elaborate $V/Vs$ system, the circuit diagram of which is shown in FIGURE 3, the boxes marked A.D.D., "IVSI" and "δ" are outside the computer and all other components and units shown are contained in the computer. In this modification, the slides A and B are mechanically linked to be set manually relative to respective resistors or impedances $R_7$ and $R_8$, in accordance with the desired reference angle of attack, the polarities being as indicated. Similarly, the slides C and D, manually movable over respective resistors or impedances $R_9$ and $R_{10}$, are mechanically linked to be moved together in accordance with the desired reference value of $\bar{h}_R$. The IVSI moves slide E over resistor $R_{11}$ in proportion to the actual vertical speed. The voltage $e\alpha$, associated with slide or brush F is passed through high resistance $R_{13}$ and is applied to the zero potential point or junction $E_o$ of operational amplifier 10 which has feedback impedance 11 connected as illustrated. The output of this amplifier is passed through the indicating instrument $\delta_M$ to ground.

The slide or brush E of the IVSI is connected to rectifier 12 in circuit with high resistance element 13 and conductor 14 connected to the junction of impedance 11 and resistor $R_{13}$. The polarity of the rectifier is as indicated. Rectifier 15, in series with capacitor 16, is bridged across rectifier 12 and is reversed relative to the polarity of rectifier 12. The junction 17 between rectifier 15 and capacitor 16 is connected to ground.

Two modes of operation of the $V/Vs$ Director are possible. The first mode occurs whenever $\bar{h}_o$ is greater than $\bar{h}_R$ (pre-set value) and the second mode of operation occurs whenever $\bar{h}_o$ is less than $\bar{h}_R$ (pre-set value).

In the first mode $\delta_1 = G(\alpha - \alpha_R + K_1\bar{h}_o)$ and in the second mode $\delta_2 = G(\alpha - \alpha_R - K_2\bar{h}_o)$ where G is a sensitivity constant of the instrument. As an example, $\bar{h}_R = 0$ would cause the indicator to display $\delta_1$ when the aircraft is climbing and would cause the indicator to display $\delta_2$ when the aircraft is descending.

*System operation.*—The $V/Vs$ Director is designed for operation through all stages of terminal area flying. The director is designed for use during take-off rotation, climb-out, holding, approach, and go-around. During rotation, climb-out, and go-around the pilot can use the $V/Vs$ Director as pitch indication to achieve the best angle of attack for the existing conditions. In this way, the pilot achieves the desired $V/Vs$ ratio. During holding and approach, the director may be used as a control for airspeed to again insure the desired $V/Vs$ ratio for existing conditions.

During take-off roll, the director will give a fast indication as rotation speed is approached. Upon reaching rotation speed the airplane is rotated to center the director. (The director does not indicate when rotation should be started.) The director is centered throughout lift-off and climb-out. With this optimum $V/Vs$ indication being held on the director, the airplane flight path will be such that the best $V/Vs$ ratio will be maintained. For example, with constant thrust, as the pilot retracts the flaps, he holds the $V/Vs$ Director Centered by controlling pitch; as a result airspeed increases. On the other hand, if the pilot decreases thrust, as for noise abatement, and flies at optimum $V/Vs$ as shown by the centered director, he will decrease rate of climb by the exact amount necessitated by the decreased thrust. The optimum condition is flown until such time as a transition to normal climb schedule is desired.

The director may also be used if a climb must be discontinued due to traffic control. Upon level-off the $V/Vs$ Director is centered by means of thrust control. This procedure will result in level flight at holding pattern airspeed, which may be desirable for terminal area departure. If no speed restriction exists, it may be at times advisable to discontinue reference to $V/Vs$ Director and proceed at a higher airspeed.

For holding patterns and/or approach the $V/Vs$ Director is used as a speed control based on angle of attack. By maintaining the $V/Vs$ Director centered, the aircraft will be flown at the airspeed giving the desired $V/Vs$ ratio regardless of configuration, bank angle, or weight. As configuration changes, the $V/Vs$ Director is continuously centered. The airspeed will then re-adjust to the proper value. Throughout the approach, the optimum $V/Vs$ will be maintained thereby permitting the optimum landing approach for the existing conditions up to the point of flare.

Upon the initiation of a go-around, thrust is increased to maximum, the $V/Vs$ Director will give an immediate indication of the pitch attitude changes required to obtain maximum climb capability for the existing configuration.

As mentioned before, my $V/Vs$ Director has been developed to give the pilot and the co-pilot of a high performance jet transport or other aircraft a simple, reliable indication for controlling the airplane to the optimum flight speed relative to the stall speed ($V/Vs$). The $V/Vs$ Director is used during take-off rotation, climb-out, landing approach and go-around. Upon reaching rotation speed, the airplane is controlled with the elevators in such a manner as to center the $V/Vs$ Director. In the event of loss of thrust through engine malfunction or for noise abatement procedures, flying the airplane so as to maintain a centered director will still result in flying at optimum $V/Vs$.

The electric output supplied by the IVSI is used to stabilize the flight path during approach or climb-out and to help program the angle-of-attack output for rotation angle and optimum climb speeds. The IVSI pointer, which responds immediately to pitch changes, is itself a check on the signal going to the $V/Vs$ Director. As long as the pointers are reacting normally to pitch changes and agree with each other, this signal source for the $V/Vs$ Director computer is functioning correctly.

The $V/Vs$ Directors are normally made to the standards 3⅛ inch size to fit into the standard panel cut-out. The directors should be located on both the pilot's and co-pilot's panels in such a manner that they are covered in the normal scan pattern of the flight instrument group. The $V/Vs$ Director is fabricated from a simple, highly reliable meter movement and presents optimum $V/Vs$ when centered, as well as fast and slow indications. A warning flag is incorporated in each director to indicate malfunction of the angle-of-attack input or an electrical failure of the system, due to unbalancing of a bridge circuit or otherwise.

*Reliability.*—System reliability and malfunction warning are obtained by the use of a "dual" system. In the system, any predetermined difference between the two angle of attack transmitter outputs or between the two IVSI outputs, or a power failure will actuate the OFF flag, in the $V/Vs$ Director Indicator, to the off position. Additional redundancy is provided by using separate outputs from the angle of attack transmitter for the pilot and co-pilot $V/Vs$ Director Indicators. Hence, a failure peculiar to one of these components such as an open potentiometer, will not cause complete system shut-down. The airplane's 28 volt battery is used as a stand-by power supply in the event of power transformer malfunction, rectifier failure, or even complete loss of A.C. in the aircraft. Although a dual system is required for the highest confidence level, the system can be operated as a single system (one $V/Vs$ Director Detector, one IVSI, and one angle of attack transmitter) or practically any other combination of components.

I have disclosed a novel and highly useful new combination of components and units, along with the necessary circuitry, to provide greater safety in flying. It is obvious that numerous changes of detail can be made by those skilled in the art, without departing from broad principles which I have disclosed.

As an illustration, the output of my $V/Vs$ Director can be applied to an elevator control to adjust the elevator automatically to maintain the proper ratio of flight speed to stall speed rather than to change the elevator manually as described. Similarly, other control members of the aircraft such as throttle, for instance, could be automatically controlled.

What I claim is:

1. In an aircraft instrument system, in combination, instrument means for determining angle of attack, an instrument for determining vertical speed of said aircraft, a computer for operatively combining outputs of said angle of attack instrument means and said vertical speed instrument, and instrument means connected with said computer for indicating the optimum ratio of flight speed to stall speed of said aircraft.

2. In an aircraft instrument system, in combination, instrument means for determining angle of attack, means settable for a desired angle of attack, an instrument for determining vertical speed of said aircraft, a computer for operatively combining outputs of said angle of attack instrument means and said settable means and said vertical speed determining instrument, and instrument means connected with said computer for indicating the optimum ratio of flight speed to stall speed of said aircraft.

3. In an aircraft instrument system, in combination, instrument means providing an electrical output proportional to angle of attack, electrical means settable in proportion to a reference angle of attack, instrument means providing an electrical output proportional to vertical speed of said aircraft, electrical means settable in proportion to a reference vertical speed, electrical computer means operatively connecting said instrument means and said electrical means for producing a signal indicative of the ratio of the optimum flight speed with respect to the stall speed of said aircraft, an operational amplifier connected to the output of said computer means, and an instrument connected with said amplifier for indicating said ratio.

4. In an aircraft instrument system, in combination, instrument means providing an electrical output proportional to angle of attack, electrical means connected with said instrument means and settable for a reference angle of attack, electrical circuit means for combining the outputs of said instrument means and said settable electrical means, a vertical speed instrument providing an electrical output proportional to vertical speed, electrical means connected with said vertical speed instrument and settable for a reference vertical speed, computer means for combining the outputs of said vertical speed instrument and said electrical means settable for a reference vertical speed for producing a signal indicative of the ratio of the optimum flight speed with respect to the stall speed of said aircraft, an operational amplifier connected to the output of said computer means, and an instrument connected with said amplifier for indicating said ratio.

5. In an aircraft instrument system, in combination, instrument means providing an output proportional to angle of attack, electrical means connected with said instrument means and settable in accordance with a reference angle of attack, an instrument providing an electrical output in accordance with vertical speed, electrical means connected with said vertical speed instrument and settable in accordance with a reference vertical speed, computer means electrically connected with said instrument means and said instrument for providing electrical output in accordance with the ratio of the optimum flight speed to the vertical speed, and means connected with said computer means and having a member moved in accordance with the ratio of aircraft speed to stall speed of said aircraft.

6. The aircraft instrument system as described in claim 5, said computer means including an operational amplifier.

7. In an aircraft instrument system, means including variable impedance means for determining angle of attack, means including variable impedance means for determining vertical speed, electrical circuitry connecting said variable impedance means, computer means including an operational amplifier electrically connected with said circuitry for producing a signal in accordance with the ratio of speed of said aircraft relative to stall speed thereof, and a device connected with said amplifier and having a member movable in accordance with said signal.

8. The aircraft instrument system as described in claim 7, said variable impedance means including impedance settable in accordance with a reference angle of attack and including impedance settable in accordance with a reference vertical speed.

9. In an aircraft instrument system, first impedance means settable in accordance with a reference angle of attack, second impedance means in circuit with said first impedance means and variable in accordance with angle of attack, a device responsive to variable angle of attack and varying said second impedance means, third impedance means settable in accordance with a reference vertical speed, fourth impedance means in circuit with said third impedance means and variable in accordance with vertical speed, a device responsive to vertical speed and varying said fourth impedance means, computer means including an oprational amplifier electrically connected with said impedance means and producing a signal in accordance with the ratio of speed of said aircraft to stall speed thereof and an electrical device electrically connected with said amplifier and having a member movable in accordance with said ratio.

10. The aircraft instrument system as described in claim 9, and including a pair of parallel-connected rectifiers of relatively reversed polarity connected between said fourth impedance means and said amplifier.

11. The aircraft instrument system as described in claim 9, the electrical device having a member movable in accordance with the ratio of speed of said aircraft to stall speed thereof including a mark in register with which said member is maintained for optimum aircraft speed with relation to stall speed thereof.

12. The aircraft instrument system as described in claim 9, said electrical device having a mark to indicate slow ratio of flight speed to stall speed and a mark to indicate fast ratio of flight speed to stall speed and a mark intermediate said marks to indicate correct ratio of flight speed to stall speed when said movable member is in register with said intermediate mark.

No references cited.

LOUIS R. PRINCE, *Primary Examiner.*